United States Patent
Choi et al.

(10) Patent No.: US 11,401,647 B2
(45) Date of Patent: Aug. 2, 2022

(54) DRIVE ASSEMBLY FOR WASHING MACHINE

(71) Applicant: LG ELECTRONICS INC., Seoul (KR)

(72) Inventors: Byungjae Choi, Seoul (KR); Gyeoungjin Jeon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 222 days.

(21) Appl. No.: 16/806,061

(22) Filed: Mar. 2, 2020

(65) Prior Publication Data
US 2021/0189628 A1    Jun. 24, 2021

(30) Foreign Application Priority Data
Dec. 19, 2019  (KR) .......................... 10-2019-0170486

(51) Int. Cl.
*D06F 37/40*    (2006.01)
(52) U.S. Cl.
CPC .................................... *D06F 37/40* (2013.01)
(58) Field of Classification Search
None
See application file for complete search history.

(56) References Cited

U.S. PATENT DOCUMENTS

| | | | |
|---|---|---|---|
| 2002/0166349 A1* | 11/2002 | Lim ........................ | D06F 37/40 68/23.7 |
| 2005/0166643 A1* | 8/2005 | Cho ...................... | D06F 39/083 68/12.02 |
| 2019/0017211 A1* | 1/2019 | Kim ........................ | D06F 37/40 |

FOREIGN PATENT DOCUMENTS

KR          100370010 B1 *  2/2003
KR     10-2019-0089616        7/2019

OTHER PUBLICATIONS

Copy Karim Nice "How Bearings Work" Oct. 11, 2000. HowStuffWorks.com. <https://science.howstuffworks.com/transport/engines-equipment/bearing.htm> Dec. 7, 2021 (Year: 2000).*

* cited by examiner

*Primary Examiner* — Michael E Barr
*Assistant Examiner* — Omair Chaudhri
(74) *Attorney, Agent, or Firm* — KED & Associates, LLP

(57) ABSTRACT

A drive assembly may transmit a driving force in a washing machine and comprise a stator and a rotor, a washing shaft connected to the rotor and to a pulsator of the washing machine, a spin-drying shaft surrounding the washing shaft and connected to an inner tub of the washing machine, a coupler provided to be vertically movable in an inner side of the spin-drying shaft to selectively connect the spin-drying shaft to and from the rotor, and a clutch providing power to move the coupler. A first bearing may support an upper outer circumferential surface of the washing shaft and a second bearing may support a lower outer circumferential surface of the washing shaft. The coupler may be provided between the first bearing and the second bearing in an axial direction.

12 Claims, 11 Drawing Sheets

DRIVE ASSEMBLY FOR WASHING MACHINE

CROSS-REFERENCE TO RELATED APPLICATION(S)

This application claims priority to and the benefit of Korean Patent Application No. 10-2019-0170486 filed in the Korean Intellectual Property Office on Dec. 19, 2019, the entire contents of which are incorporated herein by reference.

BACKGROUND

1. Field

The present disclosure relates to a drive assembly for a washing machine.

2. Background

In general, washing machines have an outer tub containing wash water and a drum rotatably provided in the outer tub to accommodate clothes, garments, and other items (hereinafter, "laundry"). Washing and spin-drying of the laundry may be performed as the drum rotates.

Washing machines may be classified into top loading types and front loading types. Top loading types are designed so that a rotation center of the drum is perpendicular to a floor so that laundry may be inserted from a top. Front loading types are designed so that the rotation center of the drum is either horizontal to the floor or inclined to be lowered toward a back end so that laundry may be inserted from a front.

Top loading types may be largely classified into agitator types and pulsator types. Agitator types rotate a laundry rod towering at a center of the drum. Pulsator types rotate a disk-shaped pulsator or drum formed in a lower section of the drum.

The front loading type is commonly referred to as a drum washing machine. A lifter may be provided on an inner circumferential surface of the drum, and as the drum rotates, the lifter may lift the laundry and drop it to perform washing.

Korean Patent Publication No. 10-2019-0089616 (published on Jul. 31, 2019) discloses a full automatic top loading type washing machine. The disclosed washing machine includes a driving assembly comprising a drive motor providing a driving force, a spin-drying shaft to rotate the outer tub, a washing shaft to drive the pulsator, and a coupler to selectively drive the spin-drying shaft and the washing shaft.

In the configuration of the driving assembly of the top loading type washing machine of the related art, a gear assembly driven during washing is provided between upper and lower bearings supporting the spin-drying shaft. A clutch distributing the driving force during washing and spin-drying is commonly located under the gear assembly, and a motor rotor or belt pulley to drive is commonly provided. However, if a length of the driving assembly is increased to satisfy durability and performance, there is a disadvantage in that a washing capacity may not be increased.

The configuration of the driving assembly of the top loading type washing machine is an important factor affecting the capacity and performance durability of the washing machine. In the top loading type washing machine, the capacity is determined according to a length of a laundry loading direction. The driving assembly (i.e., the driveline) mounted to the outer tub of the washing machine may be connected to an inner tub or drum of the washing machine and the pulsator. The spin-drying shaft to drive the inner tub that rotates during spin-drying may be supported by two bearings at upper and lower sections, respectively. Next, there is a sequence of arrangement in which the clutch, washing shaft, and motor belt pulley are located. This sequence of arrangement requires a sufficient length of the driving assembly to satisfy durability and performance. If this sequence is maintained while a length of the driving assembly is shortened to increase the washing capacity, there is a disadvantage in that the distance between the upper and lower bearings supporting the spin-drying shaft is also shortened, shortening a life and durability of the bearings.

The above references are incorporated by reference herein where appropriate for appropriate teachings of additional or alternative details, features and/or technical background.

BRIEF DESCRIPTION OF THE DRAWINGS

Embodiments will be described in detail with reference to the following drawings in which like reference numerals refer to like elements, and wherein.

DETAILED DESCRIPTION

Hereinafter, a top-loading type washing machine in which laundry is put in and taken out through the top of the washing machine will be described as an example.

Figure 1:
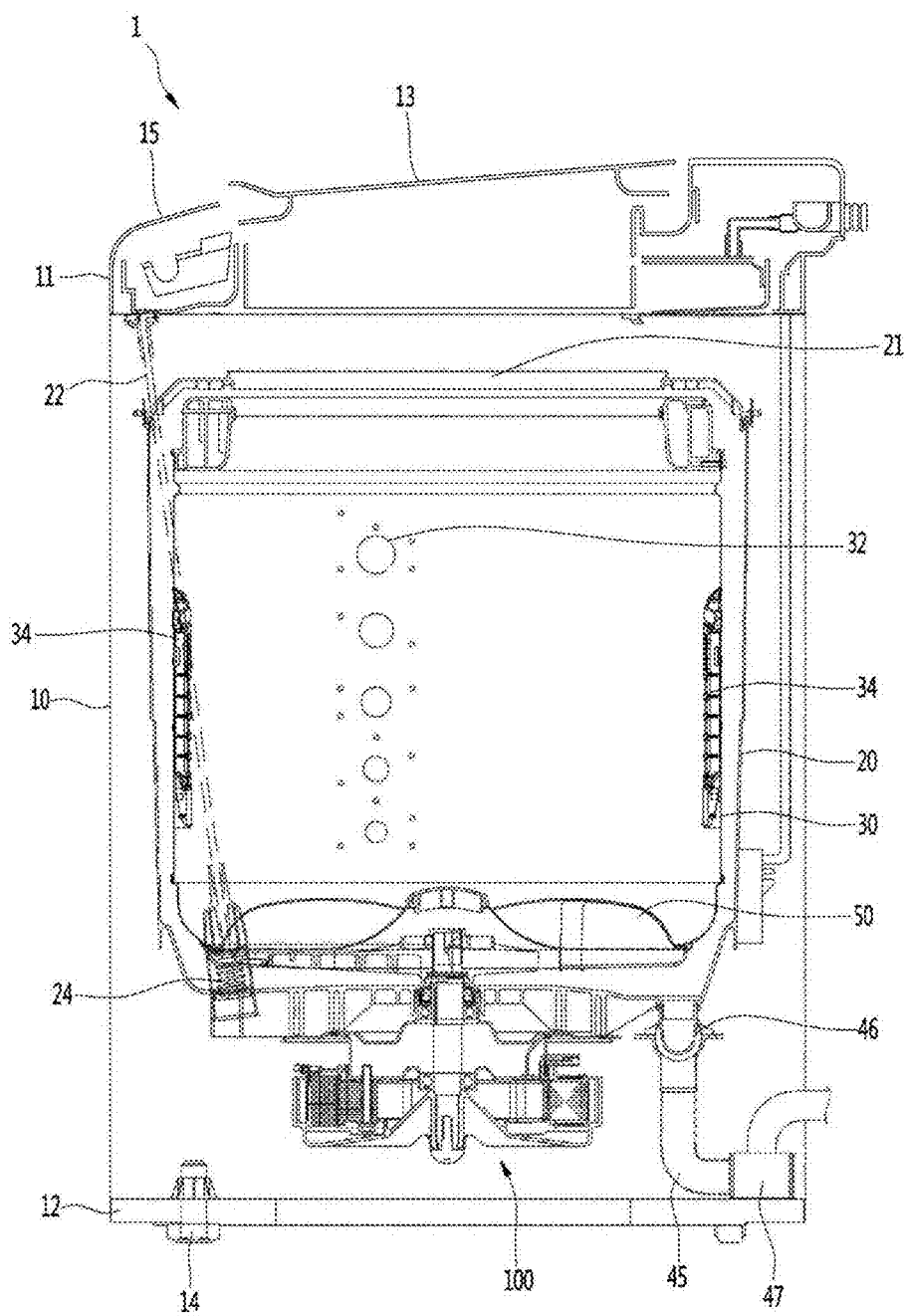
FIG. 1 is a cross-sectional view of a washing machine.

Referring to FIG. 1, a washing machine 1 may include a case 10 forming an external appearance, a top cover 11 provided at an upper end of the case 10, and a base 12 provided at a bottom of the case 10. The case 10 may be formed in a quadrangular shape having an inner space, and the top and bottom thereof may be opened.

The top cover 11 may form a laundry entrance through which laundry may be placed. An upper side of the top cover 11 may be provided with a door or lid 13 to open and close the laundry entrance. The door 13 may be provided to be rotatably coupled (e.g., hinged) to the top cover 11, but embodiments disclosed herein are not limited hereto.

The base 12 is provided to shield an open bottom of the case 10. One or more legs 14 may be provided on a bottom of the base 12 to space the base 12 away from a floor or ground surface. In addition, the legs 14 may include wheels so that an orientation of the washing machine 1 may be adjusted.

In addition, the washing machine 1 may include a control panel or user interface 15 provided on a top surface of the top cover 11. The control panel 15 may have an input assembly (e.g., buttons, touch screen, etc.) to allow the user to operate the washing machine 1 and a display assembly (e.g., LCD) which may indicate a state of the washing machine 1. The control panel 15 may be provided with a variety of printed circuit boards (PCBs), circuitry, wiring, etc. to control a configuration of the washing machine 1 in accordance with a user command input into the input assembly.

An outer tub 20 and an inner tub 30 having cylindrical shapes may be provided inside of the case 10. The inner tub 30 may have a diameter smaller than that of the outer tub 20 so as to be provided inside the outer tub 20.

The outer tub 20 may be filled with wash water to wash laundry. The outer tub 20 may be formed with an opening 21 through which the laundry may enter and exit.

The outer tub 20 may be spaced apart from the base 12 by a predetermined interval inside the case 10 by a support member or bar 22. An upper end of the support member 22 may be supported on an upper section of the case 10, and a lower end of the support member 22 may be coupled to a lower section of the outer tub 20.

The lower end of the support member 22 may be provided with a damper 24 to absorb vibrations generated during washing or drying. The damper 24 may include a spring that absorbs vibrations generated from the inner tub 30 or a driving assembly 100 described later and transmitted to the outer tub 20 through elastic deformation.

The inner tub 30 may be a washing tub or drum that is rotated by the driving assembly 100 described later to wash, rinse, and spin-dry the laundry. The inner tub 30 may be provided inside the outer tub 20, and an outer surface of the inner tub 30 may be spaced apart from an inner surface of the outer tub 20 by a predetermined distance.

A side section of the inner tub 30 may be formed with a plurality of washing holes 32 through which wash water flows in and out so that wash water supplied to the outer tub 20 may be filled in the inner tub 30. An inner circumferential surface of the inner tub 30 may be provided with a filter assembly 34 to collect various foreign matter (lint, pieces of fabric, dirt, hair, debris, etc.) included in the wash water. A plurality of filter assemblies 34 may be installed in a circumferential direction of the inner tub 30.

A water supply passage may be connected to an external water supply source to supply the wash water into the outer tub 20. The water supply passage may have a water supply valve to open and close the water supply passage. The water supply valve may be provided in plurality according to a type of water to be supplied. For example, the water supply valve may include a hot water valve and a cold water valve.

A drain passage 45 that drains the wash water from the outer tub 20 and the inner tub 30 to an outside of the washing machine 1 may be provided below the outer tub 20. The drain passage 45 may have a drain valve 46 to open and close the drain passage 45. In addition, the drain passage 45 may further include a drain pump 47 to pump the wash water from the drain passage 45 to the outside.

A pulsator 50 may be rotatably provided at a bottom of the inner tub 30 to circulate water. A driving assembly 100 may provide power to rotate the inner tub 30 or the pulsator 50.

Figure 2:
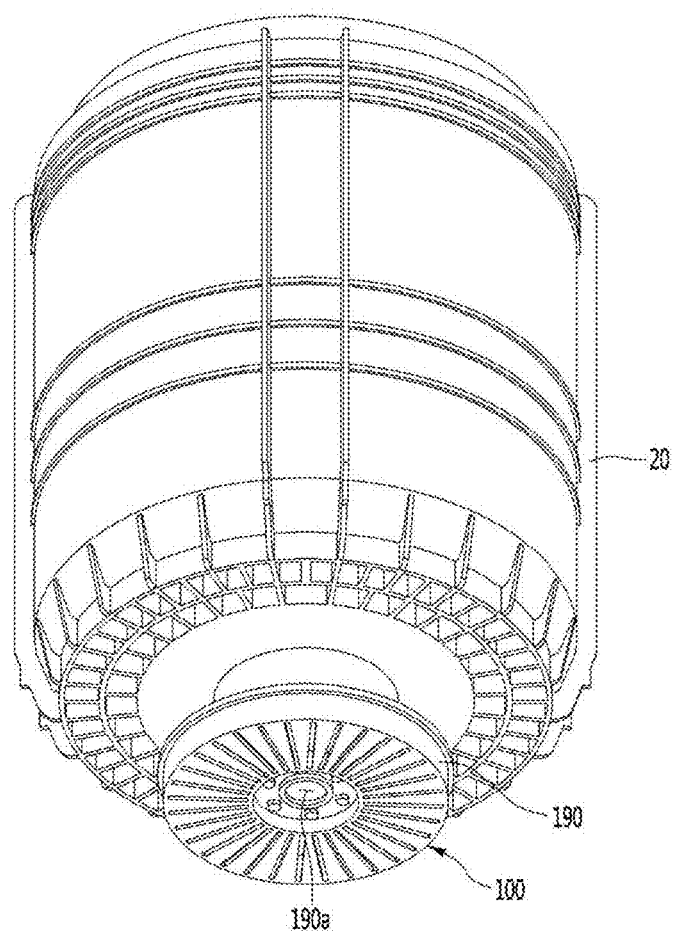
FIG. 2 is a perspective view showing a driving assembly or unit installed in an outer tub in a washing machine.
Figure 3:
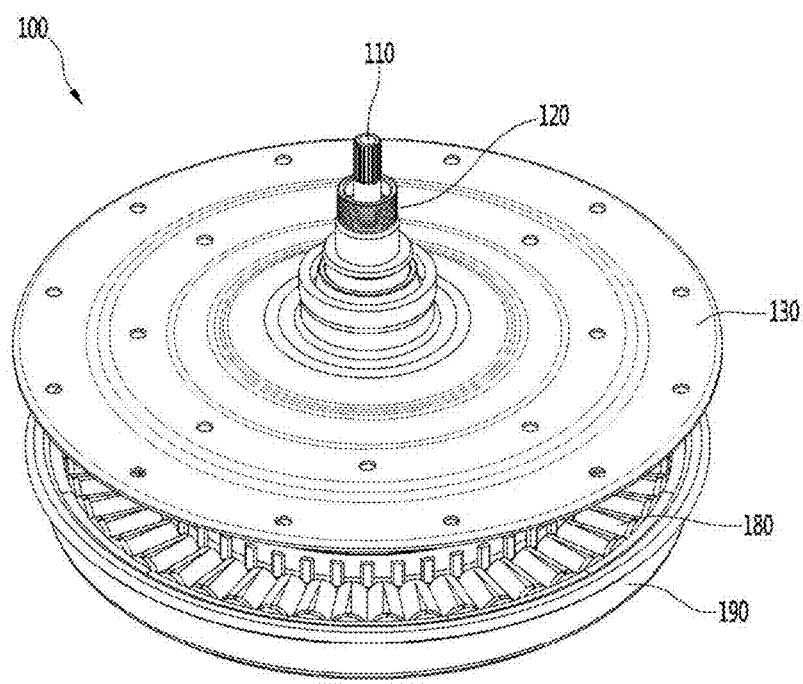
FIG. 3 is a perspective view of the driving assembly of FIG. 2.
Figure 4:
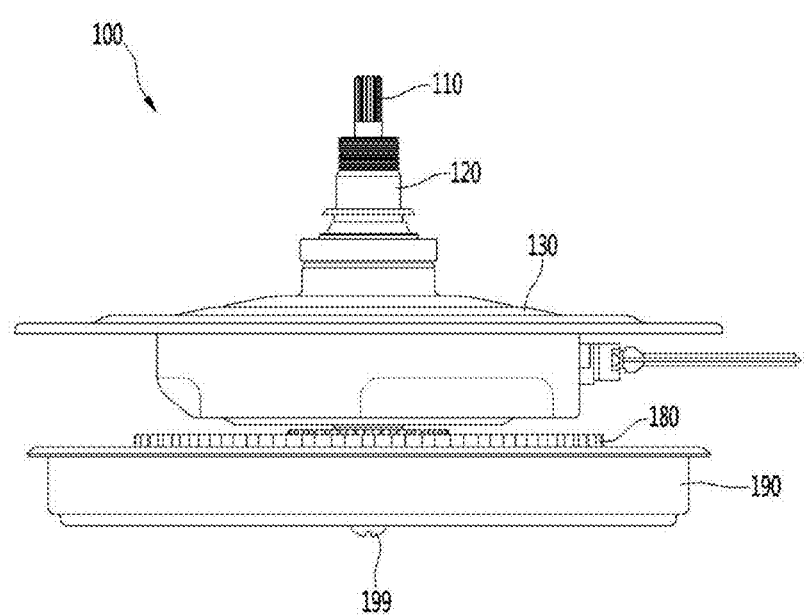
FIG. 4 is a side view of the driving assembly of FIG. 2.

Referring to FIGS. 2 to 4, the driving assembly 100 of the washing machine may be provided under the outer tub 20 to provide power to rotate the pulsator 50 or to rotate the pulsator 50 and the inner tub 30 together. The driving assembly 100 may include a washing shaft or first shaft 110 to transmit power to the pulsator 50, a spin-drying shaft or second shaft 120 to transmit rotational power to the inner tub 30, a bearing housing 130 supporting the washing shaft 110 and the spin-drying shaft 120, and a drive motor having a stator 180 and a rotor 190 provided under the bearing housing 130 to provide a driving force to the washing shaft 110 or the spin-drying shaft 120.

When the washing shaft 110 and the spin-drying shaft 120 are not engaged, the pulsator 50 may rotate, and the inner tub 30 may remain stationary. When the washing shaft 110 and the spin-drying shaft 120 are engaged via a coupler 150 described later, the pulsator 50 and the inner tub 30 may rotate together, and the inner tub 30 may serve as a drum. The inner tub 30 may function as both a stationary tub and rotating drum, but for convenience of description the word "tub" collectively refers to both tub and drum functions.

Referring to FIGS. 5 to 8, the washing shaft 110 may include an upper washing shaft 111 and a lower washing shaft 115 positioned below the upper washing shaft 111. The spin-drying shaft 120 may include an upper spin-drying shaft 121 and a lower spin-drying shaft 125 positioned below the upper spin-drying shaft 121.

The upper washing shaft 111 may penetrate the center of the upper spin-drying shaft 121 and protrude into the inner tub 30. An upper end of the upper washing shaft 111 protruding into the inner tub 30 may be coupled to the pulsator 50. A lower end of the upper washing shaft 111 extending downward may be connected to an epicyclic gear module 140 provided in the bearing housing 130. The upper washing shaft 111 may be fixed to the bottom of the inner tub 30 to be rotated in one body with the inner tub 30

The lower washing shaft 115 may be spaced downward from the upper washing shaft 111. A lower end of the lower washing shaft 115 may be coupled to a rotor 190 of the drive motor, and an upper end of the lower washing shaft 115 may be connected to the epicyclic gear module 140. The epicyclic gear module 140 may connect the lower end of the upper washing shaft 111 to the upper end of the lower washing shaft 115.

The upper washing shaft 111 may be inserted through the upper spin-drying shaft 121 so that the upper spin-drying shaft 121 and the upper washing shaft 111 are concentric. An upper end of the upper spin-drying shaft 121 may be coupled to the inner tub 30 to transmit a rotational force to the inner tub 30, and a lower end of the upper spin-drying shaft 121 may be connected to the epicyclic gear module 140.

The lower spin-drying shaft 125 may be spaced downward from the upper spin-drying shaft 121. The lower washing shaft 115 may be inserted through the lower spin-drying shaft 125 such that the lower spin-drying shaft 125 and the lower washing shaft 115 are concentric. An upper end of the lower spin-drying shaft 125 may be connected to the epicyclic gear module 140, and a lower end of the lower spin-drying shaft 125 may be coupled to the rotor 190 by a coupler 150 to be described later to receive the rotational force. A serration serration-fitted with the coupler 150 may be formed on an outer circumferential surface of the lower spin-drying shaft 125 so that the coupler 150 may be movable up and down along the lower spin-drying shaft 125 (i.e., in an axial direction of the washing shaft 110).

The rotational force generated by the drive motor may be decelerated through the epicyclic gear module 140 and transmitted to the upper washing shaft 111 and/or the upper spin-drying shaft 121. The pulsator 50 or the inner tub 30 may be rotated with a relatively high torque to enable efficient operation of the drive motor. As a result, the drive motor may be made slimmer.

The bearing housing 130 may support the washing shaft 110 and the spin-drying shaft 120, and the epicyclic gear module 140, which may have a plurality of gears, may be provided in the bearing housing 130. The bearing housing 130 may be provided under and fixed to the bottom of the outer tub 20 by a fastening member (e.g., bolt, boss, or screw). A plurality of fastening holes 131 may be formed at an edge of an upper surface of the bearing housing 130 to allow the fastening member to pass therethrough, and the plurality of fastening holes 131 may be spaced apart in a circumferential direction of the housing 130. The fastening member penetrating the fastening holes 131 may be inserted and fixed to the bottom of the outer tub 20.

The bearing housing 130 may include a housing case 130a forming an inner space in which the epicyclic gear module 140 may be provided at an inner center thereof and a housing cover 130b covering an opened upper surface of the housing case 130a. The plurality of fastening holes 131 may be provided at an outer edge of the housing cover 130b at equal intervals from each other.

A clutch stopper 160 may be coupled to a lower part of the bearing housing 130 by a fastening member (e.g., bolt, boss, or screw). A plurality of fastening holes 133 may be formed through a bottom surface of the housing case 130a to allow the fastening member to pass therethrough. As the fastening member penetrates the clutch stopper 160 and is inserted into the fastening holes 133, the clutch stopper 160 may be mounted on the bottom surface of the bearing housing 130. The plurality of fastening holes 133 may be formed in plural and may be provided at equal intervals from each other.

The upper washing shaft 111 and the upper spin-drying shaft 121 may be inserted through a center of the housing cover 130b. A sleeve 130c in which a bearing may be inserted may be extended and formed at a center of the housing cover 130b, and the upper spin-drying shaft 121 may penetrate the sleeve 130c to be connected to the epicyclic gear module 140. An upper shaft support bearing 103 may be interposed between the outer circumferential surface of the upper spin-drying shaft 121 and the sleeve 130c so that the upper spin-drying shaft 121 may be rotatably supported. When the upper spin-drying shaft 121 is rotated, a friction force between the upper spin-drying shaft 121 and the sleeve 130c may be reduced or prevented by the upper shaft support bearing 103.

The lower washing shaft 115 and the lower spin-drying shaft 125 may be inserted through a center of the bottom of the housing case 130a. A sleeve 130d may be extended and formed at the center of the bottom of the housing case 130, and the lower spin-drying shaft 125 may penetrate the sleeve 130d to be connected to the epicyclic gear module 140. A lower shaft support bearing 105 may be provided between the sleeve 130d and the lower spin-drying shaft 125 so that the lower spin-drying shaft 125 may be rotatably supported.

The drive motor may be provided below the bearing housing 130. The drive motor may include a stator 180 that generates a magnetic force by an applied power source and the rotor 190 that rotates by an induced electromotive force through interaction with the stator 180. The stator 180 may include a yoke 181 formed by stacking a magnetic core on an inner circumferential surface, a pole 183 radially protruding from the side of the yoke 181 and formed by winding a coil 182, and an insulator 184 covering the outer circumferential surface of the magnetic core to prevent direct contact between the coil 182 and the magnetic core. There may be a plurality of poles 183 formed to be spaced apart in a circumferential direction.

The stator 180 may further include a fastening protrusion or ledge 185 protruding from an inner circumferential surface of the insulator 184 toward a center of the yoke 181. The fastening protrusion 185 may be formed with a fastening hole 186 through which a fastening member (e.g., bolt, boss, or screw) may be inserted to fasten the stator 180 to the bearing housing 130. The fastening member may be inserted into the bottom surface of the bearing housing 130 through the fastening hole 186. The clutch stopper 160 may be interposed between the stator 180 and the bearing housing 130, and the fastening member may sequentially penetrate the stator 180, the clutch stopper 160, and the bearing housing 130.

A plurality of fastening protrusions 185 may be provided along the circumferential direction on the inner circumferential surface of the yoke 181 at the equal intervals. As an example, five or six fastening protrusions 185 may be formed on the inner circumferential surface of the yoke 181 at predetermined intervals. In this case, the stator 180 may form a 5-point or 6-point fastening structure supported by the 5 or 6 points on the bearing housing 130. The stator 180 may be supported by being fastened to the bearing housing 130 by 3 points. An amount of vibration transmission may be reduced through this 3-point fastening structure. When the vibration generated in the drive motor is transmitted toward the bearing housing 130 through the clutch stopper 160, the fastening member serving as a transmission medium may be reduced, thereby reducing the amount of vibration transmission.

The rotor 190 may rotate due to an electrode difference from the stator 180. The rotor 190 may be provided to surround an outer circumferential surface of the stator 180. For example, the rotor 190 may have a flat cylindrical shape having an open top surface. In addition, the stator 180 may be placed inside the rotor 190 through the open top surface to form an outer rotor type motor.

Figure 8:
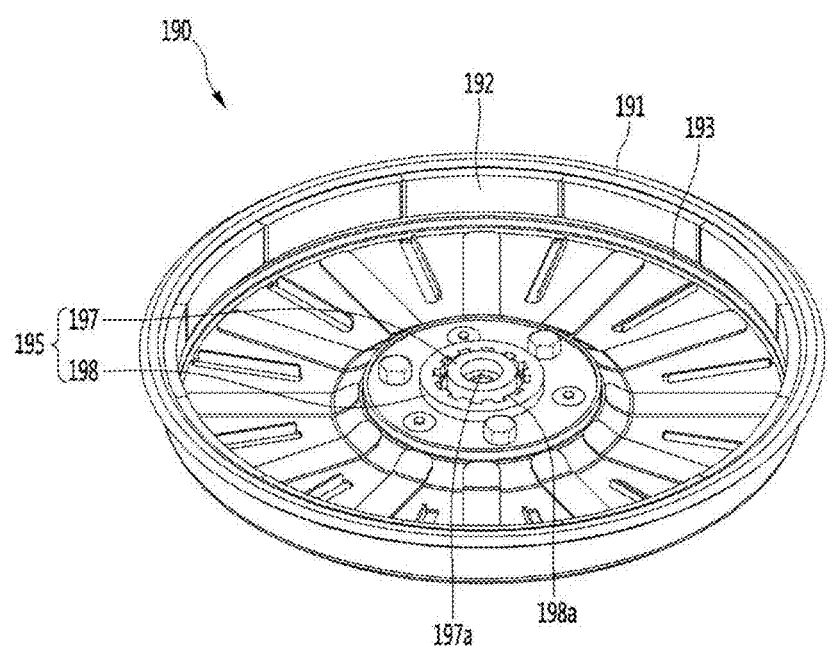
FIG. 8 is a perspective view illustrating a rotor of a driving assembly of FIG. 5.

Referring to FIG. 8, the rotor 190 may include a rotor frame 191 forming an external appearance and a magnet 192 attached to an inner wall of the rotor frame 191. In addition, a stepped part or flange 193 on which the magnet 192 is mounted and which supports a lower end of the magnet 192 may be formed on the inner wall of the rotor frame 191.

A center of the rotor 190 may be provided with a shaft coupling part 195 to couple the lower washing shaft 115 and the lower spin-drying shaft 125. The shaft coupling part 195 may include a shaft coupling boss 197 formed with a shaft through-hole 197a through which the lower washing shaft 115 passes, and a spin-drying shaft coupling part or outer boss 198 formed on an outer side of the shaft coupling boss 197 and formed with a first serration-fitting assembly 198a serration-fitted with the serration of the coupler 150.

The shaft coupling part 195 may be fixedly coupled to the rotor 190 to rotate with the rotor 190 as one body. A fastening member 199 (e.g., a bolt or screw) may be fitted to an end of the lower washing shaft 115 penetrating the shaft coupling part 195 so that the lower washing shaft 115, the shaft coupling part 195, and the rotor 190 may be configured to rotate as one body.

The epicyclic gear module 140 of the driving assembly 100 may increase torque transmitted to the pulsator 50 by reducing a rotational force generated in the drive motor. The epicyclic gear module 140 may include a epicyclic gear case 145, a sun gear 144 provided in the epicyclic gear case 145, a plurality of epicyclic gears 142 engaged with an outer circumferential surface of the sun gear 144, and a carrier 141 supporting the plurality of epicyclic gears 142.

In the carrier 141, a plurality of gear shafts 143 to which the epicyclic gears 142 are fitted may be provided in a circumferential direction, and a through-hole which the gear shaft 143 penetrates may be formed at the center of the epicyclic gear 142. The carrier 141 may support the plurality of epicyclic gears 142 and may rotate together with the epicyclic gear 142. The sun gear 144 may be provided at the center of the plurality of epicyclic gear 142, and the epicyclic gear 142 may be engaged with the sun gear 144 to rotate. The plurality of epicyclic gears 142 may be serration-fitted with a serration formed on an inner circumferential surface of the epicyclic gear case 145 to rotate.

The upper end of the lower spin-drying shaft 125 may be fixed to a bottom surface of the epicyclic gear case 145 so that the lower spin-drying shaft 125 and the epicyclic gear case 145 may rotate as one body. The lower spin-drying shaft 125 may be formed of a cylindrical shaft part 125a which the lower washing shaft 115 penetrates and a circular support part 125b extending in a direction orthogonal to the shaft part 125a (i.e., horizontally or radially) at an upper end of the shaft part 125a. The support part 125b may form the bottom surface of the epicyclic gear case 145 to support the sun gear 144 and the epicyclic gears 142.

An upper end of the epicyclic gear case 145 may be connected to the upper spin-drying shaft 121 as one body. A round octagonal groove may be formed in an upper part of the carrier 141 to be combined with the lower end of the upper washing shaft 111. The carrier 141 may rotate as one body with the upper washing shaft 111.

The sun gear 144 may be connected to the upper end of the lower washing shaft 115. In the washing mode, the rotational force generated by the drive motor is sequentially transmitted to the sun gear 144, the epicyclic gear 142, the carrier 141, and the upper washing shaft 111 through the lower washing shaft 115. In addition, the rotational force generated by the drive motor is converted into a form in which the rotational speed is reduced but the torque is increased by the epicyclic gear module 140 and transmitted to the upper washing shaft 111.

Referring back to FIGS. 5 and 7, the coupler 150 may be coupled to the outer circumferential surface of the lower spin-drying shaft 125 to move in the vertical direction (up and down) along the lower spin-drying shaft 125. The coupler 150 may vertically move along the lower spin-drying shaft 125 to selectively transmit a rotational force by the rotation of the rotor 190 to the lower spin-drying shaft 125 and the lower washing shaft 115.

The coupler 150 may include a cylindrical body 151 having a serration on upper and lower surfaces. A through hole may be formed at the center of the body 151 to allow the lower spin-drying shaft 125 to penetrate. In addition, a serration serration-fitted with the outer circumferential surface of the lower spin-drying shaft 125 may be formed on an inner circumferential surface of the through hole.

The coupler 150 may descend along the lower spin-drying shaft 125 when the serration formed on the inner circumferential surface of the through hole is coupled with the serration formed on the outer circumferential surface of the lower spin-drying shaft 125. A serration formed on a lower surface of the coupler 150 may be coupled to the first serration-fitting assembly 198a of the spin-drying shaft coupling part 198. When the coupler 150 ascends, the first serration-fitting assembly 198a of the spin-drying shaft coupling part 198 of the rotor 190 may be separated from the serration formed on the lower surface of the coupler 150.

A flange or rib 152 extending in the radial direction of the body 151 may be formed on an upper end of the body 151. A stop gear 153 may be formed along the circumferential direction at an upper edge of the flange 152. A connecting gear 155 serration-fitted with the first serration-fitting assembly 198a of the spin-drying shaft coupling part 198 may be formed along a circumferential edge of a lower end of the body 151. When switching from the washing mode to the spin-drying mode, a compression spring to push the coupler 150 downward may be provided between an upper surface of the coupler 150 and the lower shaft support bearing 105.

The driving assembly 100 may further include a clutch mechanism 170 to switch the power transmission path of the drive motor to the washing shaft 110 or the spin-drying shaft 120 in response to a washing operation or a spin-drying operation. The clutch mechanism 170 may function to ascend the coupler 150 to the ascended position by operation of a clutch motor.

The clutch mechanism 170 may include a clutch motor installed below the outer tub 20, a cam coupled to a drive shaft of the clutch motor, a lever guide 171 fixed to the inside of the bearing housing 130, and a lever 172 that linearly reciprocates under guidance of the lever guide 171 when the clutch motor is turned on and off.

The clutch mechanism 170 may further include a connecting rod 173 installed between the cam of the clutch motor and the lever 172 to pull the lever 172 toward the clutch motor according to a driving of the clutch motor, and a return spring having one end fixed to the lever guide 171 and the other end fixed to the lever 172 to provide a restoring force to the lever 172. The clutch mechanism 170 may further include a mover 174 descending along an inclined surface of the lever 172 when the clutch motor is turned on, a plunger 175 moving up and down along a guide groove inside the mover 174, and a shock absorbing spring 176 provided on an outer circumferential surface of the plunger 175.

A clutch lever 177 to substantially support the coupler 150 may be provided at a lower end of the plunger 175. One end of the clutch lever 177 may be coupled to the plunger 175, and the other end of the clutch lever 177 may be in contact with the coupler 150 so that the clutch lever 177 may elevate the coupler 150.

The clutch lever 177 may include a connector or protrusion 177a coupled to an end of the plunger 175, a support 177b extending from the connector 177a toward the coupler 150, and a fixing pin 177c extending from both side edges of the connector 177a to become a rotation center of the clutch lever 177. The fixing pin 177c may be defined as a hinge axis.

One end of the connector 177a may be connected to the end of the plunger 175, and the support 177b may be formed at the other end of the connector 177a. The connector 177a and the support 177b may extend horizontally. The fixing pin 177c may penetrate the connector 177a in the horizontal direction and may be coupled to the clutch stopper 160 such that the support 177b may be hingedly coupled to the clutch stopper 160 by the fixing pin 177c and rotatably installed by a predetermined amount.

The support 177b may protrude toward the coupler 150 from the end of the connector 177a to move the coupler 150 up or down. The support 177b may press the coupler 150 to an ascended position when switching to the washing mode.

The support 177b may extend in both directions toward the coupler 150 from the end of the connector 177a so that the support 177b and the connector 177a form a 'Y' shape. Two ends of the extended support 177b may be provided to surround an edge of the coupler 150.

At least a part of the support 177b may surround an outer circumferential surface of the body 151 of the coupler 150. A part of an upper surface of the support 177b may be in contact with a lower surface of the flange 152 of the coupler 150. The support 177b may be caught on the outer circumferential surface of the coupler 150, or may be fixed to a part of the outer circumferential surface of the coupler 150. Various methods of contacting the coupler 150 with the support 177b may be implemented in addition to the method described in the embodiments of the present disclosure.

The driving assembly 100 may further include the clutch stopper 160 to limit an amount of rotation of the clutch lever 177. The clutch stopper 160 may suppress a movement of the coupler 150 so as not to impact the clutch motor, the washing shaft 110, or the spin-drying shaft 120 as the coupler 150 is rotated after the coupler 150 is released from the rotor 190.

The clutch stopper 160 may be fixed to the bottom surface of the bearing housing 130 by a fastening member. The clutch stopper 160 may be hingedly coupled to the clutch lever 177 to be rotatable. The clutch stopper 160 may guide the clutch lever 177 to raise or lower the coupler 150 stably.

Figure 6:
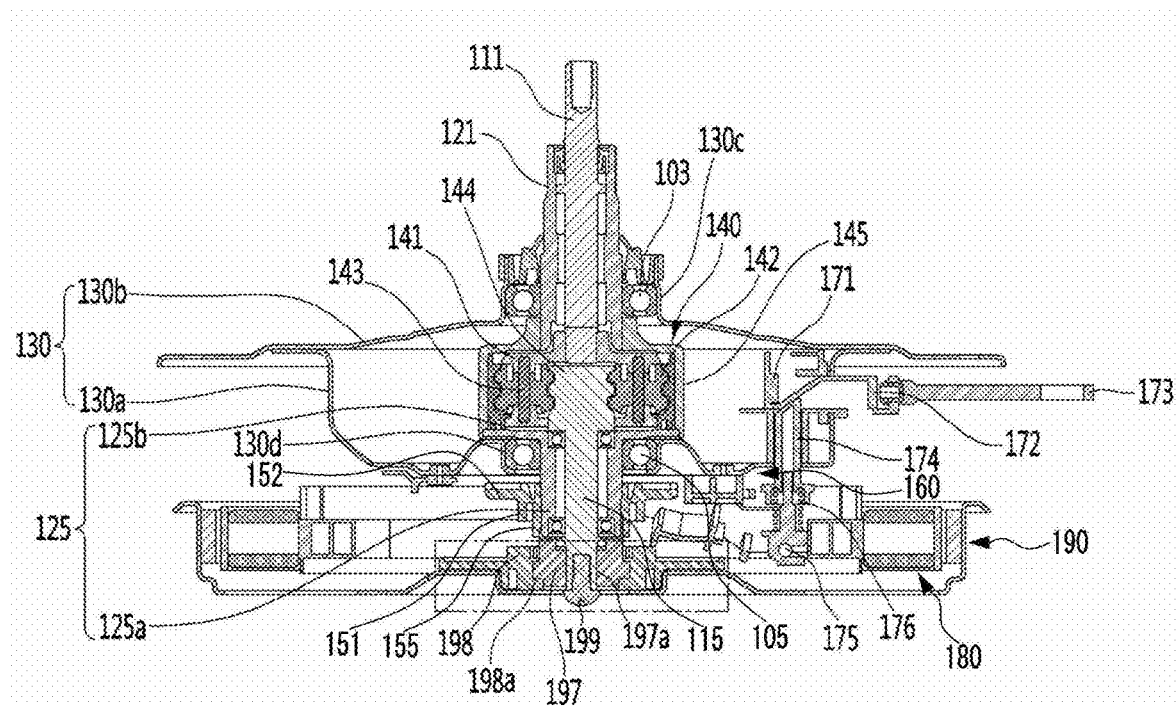
FIG. 6 is an axial cross-sectional view of a driving assembly in a washing mode of a washing machine according to a comparative embodiment.
Figure 7:
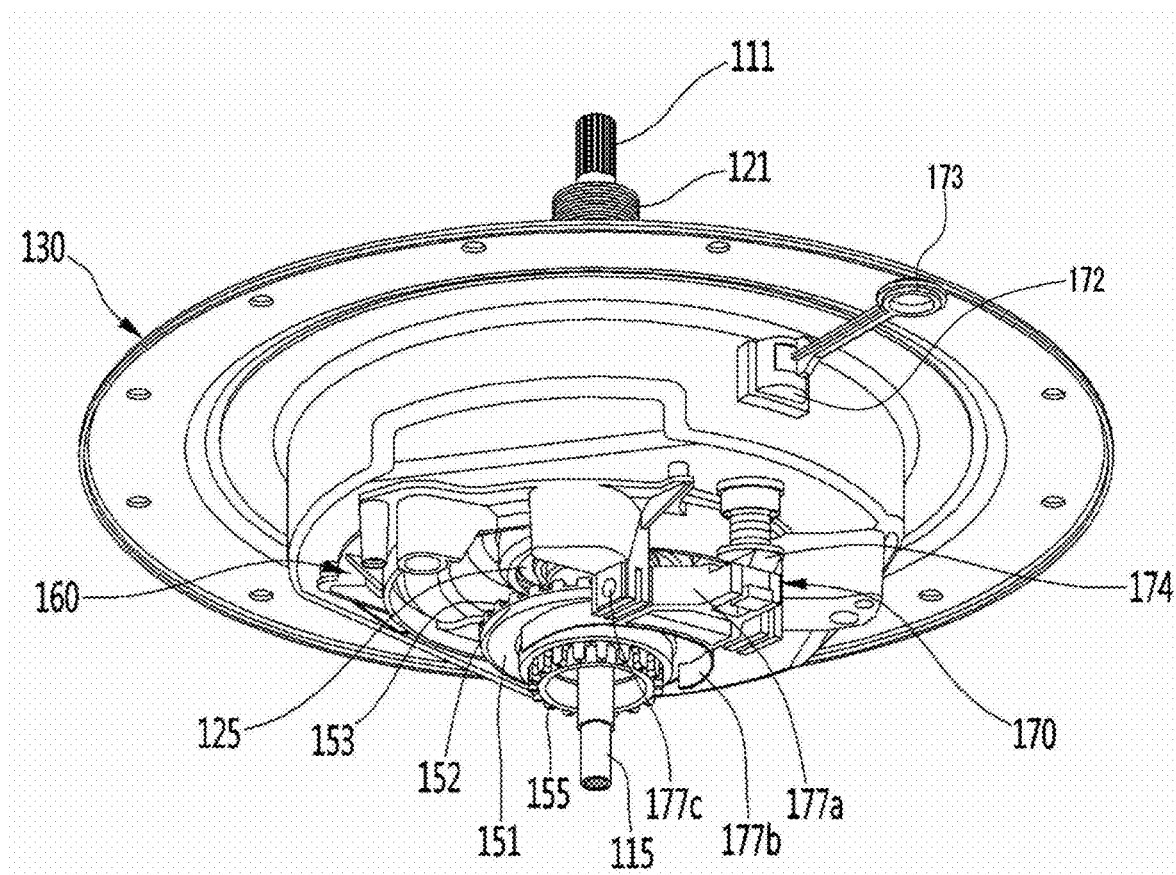
FIG. 7 is a perspective view illustrating a drive motor removed from the driving assembly of FIG. 5.

Referring to FIG. 6, when a washing instruction is input into the washing machine 1 (by, e.g., the control panel 15 of FIG. 1), the clutch motor of the clutch mechanism 170 may be turned on. When the clutch motor is turned on, the connecting rod 173 may be pulled toward the clutch motor and the lever 172 may be pulled together with the connecting rod 173.

When the lever 172 is pulled toward the clutch motor, the mover 174 may descend on the inclined surface of the lever 172. When the plunger 175 descends together with the mover 174, the clutch lever 177 may rotate or pivot upward by a pushing force of the plunger 175.

As the clutch lever 177 is moved upwards, the clutch lever 177 may push the coupler 150 upwards, and the coupler 150 may ascend along the lower spin-drying shaft 125. The coupler 150 may be released from a coupling with the rotor 190 and coupled to the lower spin-drying shaft 125. The coupler 150 may leave the rotor 190 so that only the washing shaft 110 rotates when the rotor 190 rotates.

In the washing mode, a serration formed on an inner circumferential surface of the coupler 150 may be engaged only with the serration of the outer circumferential surface of the lower spin-drying shaft 125 and not engaged with a serration of the spin-drying shaft coupling part 198 engaged with the lower washing shaft 115. The rotational force of the rotor 190 may be transmitted only to the pulsator 50 through the washing shaft 110. Looking at the rotational force transmission process of the rotor 190 in the washing mode, the rotational force by the rotor 190 may be sequentially transmitted to the shaft coupling boss 197 of the rotor 190, the lower washing shaft 115 coupled to the shaft coupling boss 197, the sun gear 144, the epicyclic gear 142, the carrier 141, and the upper washing shaft 111.

In the spin-drying mode, when the coupler 150 descends, the first serration-fitting assembly 198a and a second serration-fitting assembly 155 are serration-fitted. While the rotational force of the rotor 190 is transmitted to the lower spin-drying shaft 125, the rotor 190 and the lower spin-drying shaft 125 may rotate together.

In the washing mode, when the coupler 150 ascends, the first serration-fitting assembly 198a and a second serration-fitting assembly 155 may be separated, as power transmission may be interrupted between the lower spin-drying shaft 125 and the rotor 190. The rotor 190 may rotate and the lower spin-drying shaft 125 may stop.

The shaft coupling boss 197 formed with the shaft through-hole 197a which the lower end of lower washing shaft 115 penetrates may be fixed to a central part of the spin-drying shaft coupling part 198. The spin-drying shaft coupling part 198 and the shaft coupling boss 197 may be formed integrally as one body. The spin-drying shaft coupling part 198 may form a groove part 198b formed such that at least a part thereof has an inward concave curvature along an inner circumference, and the shaft coupling boss 197 may form a protrusion part 197b whose at least a part protruding outward along an outer circumferential surface to be fitted into the groove part 198b.

The protrusion part 197b and the groove part 198b may be formed to be uneven. The protrusion part 197b and the groove part 198b may be formed in a shape of a gear tooth.

Figure 9:
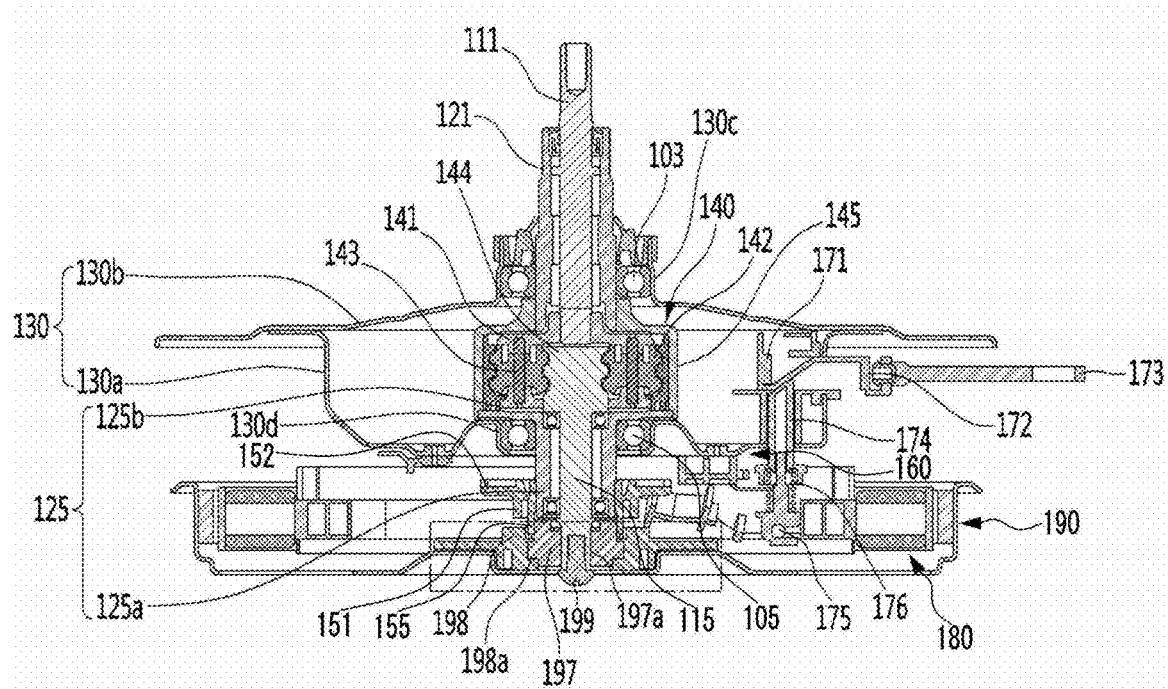
FIG. 9 is an axial cross-sectional view of a driving assembly in a spin-drying mode of a washing machine according to a comparative embodiment.

Referring to FIG. 9, when a spin-drying instruction is input into the washing machine 1, the clutch motor of the clutch mechanism 170 may be turned off. When the clutch motor is turned off, the connecting rod 173, which was pulled toward the clutch motor, may be returned to its original position. The mover 174 may ascend along the inclined surface of the lever 172. When the plunger 175 ascends together with the mover 174, the clutch lever 177 may rotate or pivot downward.

The clutch lever 177 may be moved downward and the coupler 150 may descend by a self-weight and a pushing force of the compression spring. When the coupler 150 descends completely along the lower spin-drying shaft 125, the connecting gear 155 formed at a lower part of the coupler 150 may be engaged with the first serration-fitting assembly 198a of the spin-drying shaft coupling part 198.

When the coupler 150 descends completely, the coupler 150 may be coupled to the rotor 190 and also to the lower spin-drying shaft 125. Since the coupler 150 may transmit the rotational force generated by the rotor 190 to the lower washing shaft 115 and the lower spin-drying shaft 125 at the same time, the washing shaft 110 and the spin-drying shaft 120 may be rotated at high speed so that spin-drying proceeds.

The washing shaft 110 and the spin-drying shaft 120 may rotate as one body. When the sun gear 144 rotates with the lower washing shaft 115 inside the epicyclic gear module 140, the epicyclic gear 142 may revolve around the sun gear 144 when engaged with the sun gear 144 without rotating. The washing shaft 110 and the spin-drying shaft 120 may be rotated at the same rotational speed.

Figure 10:
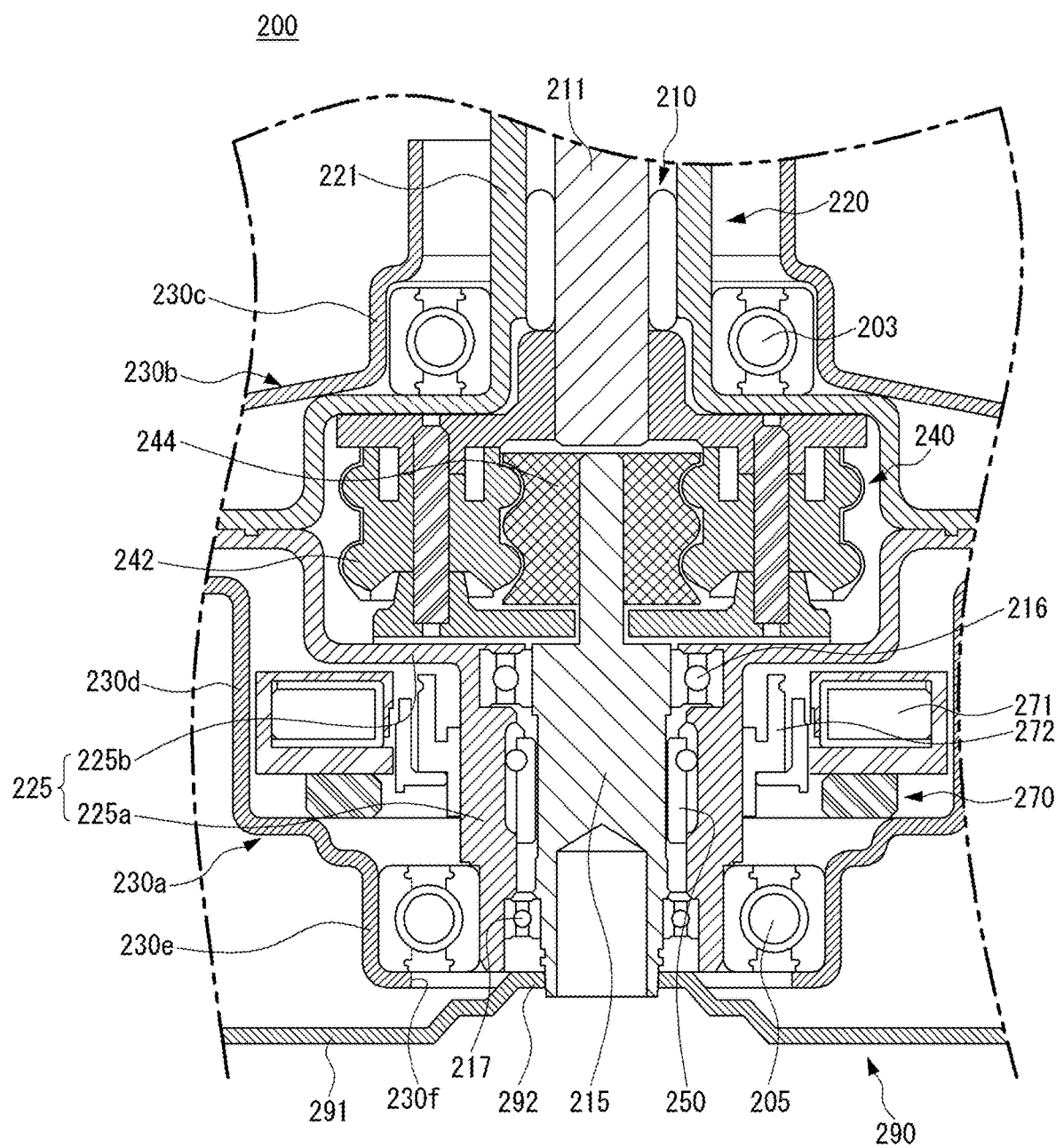
FIG. 10 is an axial cross-sectional view of a driving assembly in a washing mode of a washing machine according to an embodiment of the present disclosure.
Figure 11:
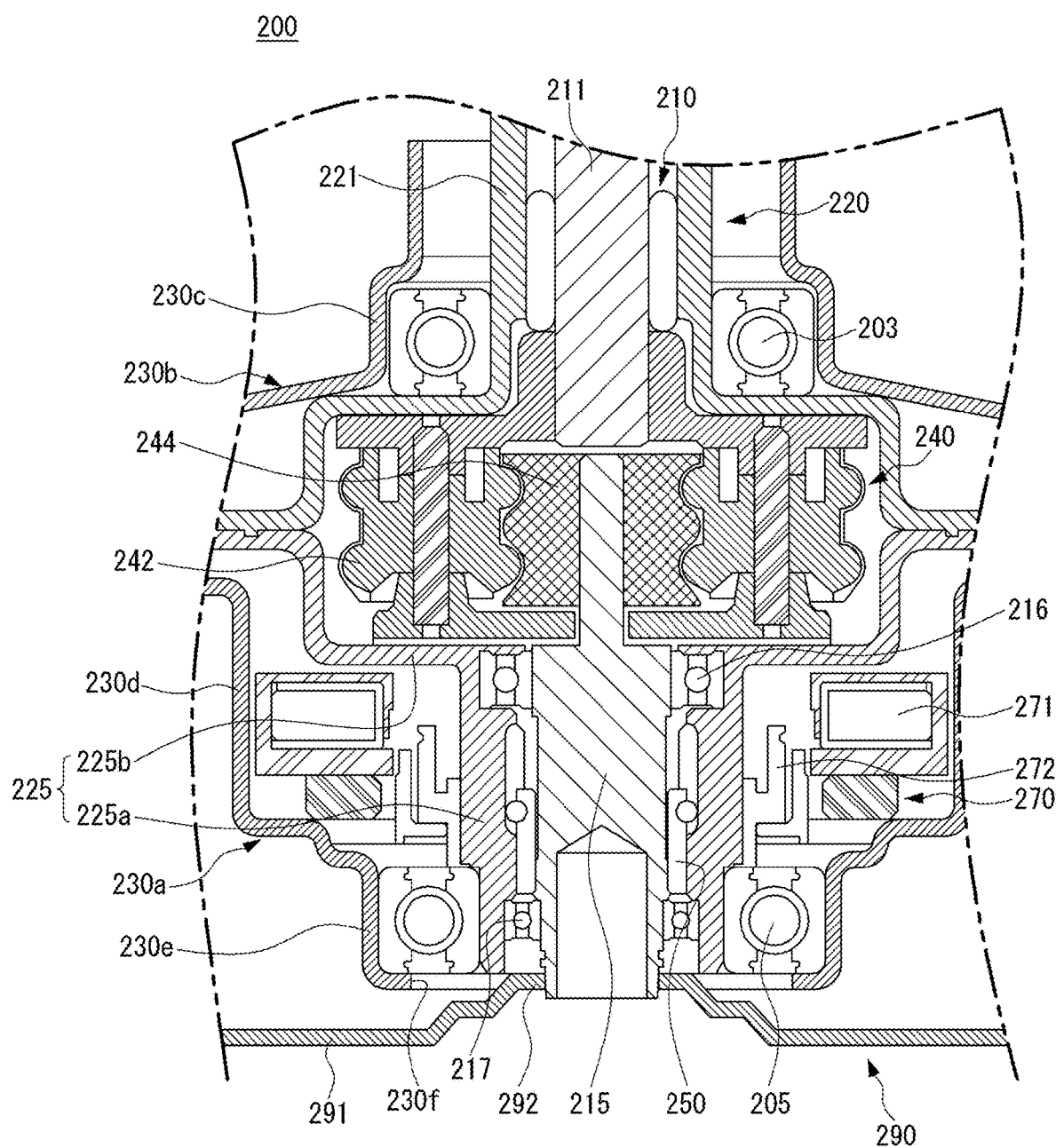
FIG. 11 is an axial cross-sectional view for describing a driving assembly in a spin-drying mode of a washing machine according to an embodiment of the present disclosure.

Referring to FIGS. 10 and 11, in a driving assembly 200 according to an embodiment of the present disclosure, a clutch mechanism 270 may be provided in bearing housings 230a and 230b. The clutch mechanism 270 may include a clutch motor 271 provided as a clutch driving component or assembly and a clutch core 272 provided inside the clutch motor 271 as a clutch moving component or assembly that moves in an axial direction by an electromagnetic force generated by the clutch motor 271.

The clutch motor 271 may be provided with an alternating current (AC) motor constituting a kind of solenoid and may be formed in an annular shape and fixed to the bearing housing 230. The clutch core 272 may be made of a magnetic material and may be provided in a free state with respect to the clutch motor 271 so as to move in the axial direction in the inside of the clutch motor 271.

The clutch core 272 may be connected with a coupler 250. The coupler 250 may move together with the clutch core 272. The coupler 250 may be formed integrally with the clutch core 272 as one body, or alternatively the coupler 250 and the clutch core 272 may be formed separately and later combined.

The clutch core 272 may be provided outside a lower spin-drying shaft 225, and the coupler 250 may be provided inside the lower spin-drying shaft 225. The clutch core 272 may be supported or guided on an outer circumferential surface of the lower spin-drying shaft 225 to move up and down, and the coupler 250 may be supported by or guided on an inner circumferential surface of the lower spin-drying shaft 225 to move up and down.

Depending on whether power is applied to the clutch motor 271, as the clutch core 272 moves in the axial direction and moves toward or away from the clutch motor 271, the clutch core 272 may switch the coupler 250 to the washing mode or the spin-drying mode.

A lower washing shaft 215 may be provided to be independently rotatable with respect to the lower spin-drying shaft 225. First and second bearings 216 and 217 may be interposed between the lower washing shaft 215 and the lower spin-drying shaft 225. The first bearing 216 may support an upper part or section of the lower washing shaft 215 and the second bearing 217 may support a lower part or section of the lower washing shaft 215.

As confirmed by experiment, as a distance between an upper bearing and a lower bearing supporting a shaft decreases, a reaction force acting on the bearings increases, which shortens the life of the bearing. For example, it has been experimentally confirmed that in a case where the same load acts on the shaft, if the distance between the upper bearing and the lower bearing supporting the shaft is changed from 50 mm to 30 mm, the life of the upper bearing decreased from 372 hours to 80 hours and the life of the lower bearing decreased from 103 hours to 35 hours. The driving assembly 200 according to the present disclosure may maintain a relatively long distance between the first bearing 216, which may be an upper bearing, and the second bearing 217, which may be a lower bearing, while reducing a length of the lower washing shaft 215 by providing the coupler 250 and the clutch mechanism 270 between the first bearing 216 and the second bearing 217.

Figure 5:
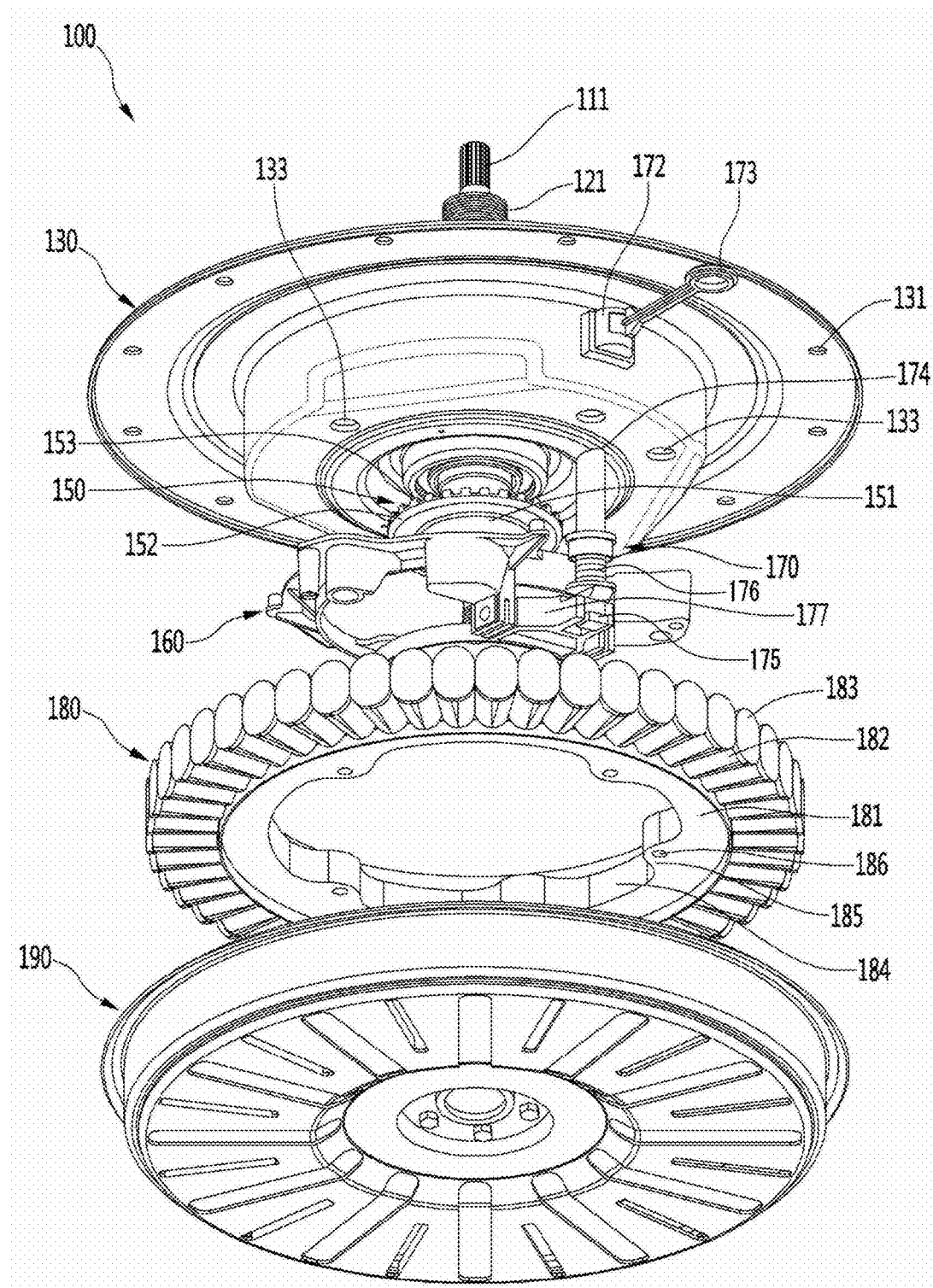
FIG. 5 is an exploded perspective view of a driving assembly according to a comparative embodiment.

Referring to FIGS. 5-6, in the driving assembly 100 according to the comparative embodiment, since the clutch mechanism 170, the shaft coupling boss 197 and the spin-drying coupling part 198 are provided below both the upper and lower bearings supporting the lower washing shaft 115, in order to reduce the length of the lower washing shaft 115, the distance between the upper and lower bearings must also decrease, which may weaken durability of the bearings.

However, the driving assembly 200 according to the embodiment of the present disclosure shown in FIGS. 10 and 11 may sufficiently secure the distance between the first bearing 216 and the second bearing 217 by positioning the first bearing 216 directly below an epicyclic gear module 240 and the second bearing 217 at a lower end of the lower washing shaft 215. The length of the lower washing shaft 215 may be reduced by providing the coupler 250 and the clutch mechanism 270 between the first bearing 216 and the second bearing 217 to selectively transmit power of the drive motor (i.e., the stator and the rotor 290) to a spin-drying shaft 220.

Although the clutch mechanism 270 is illustrated to be below the epicyclic gear module 240 in FIGS. 10 and 11, the clutch mechanism 270 may alternatively be provided above the epicyclic gear module 240. In such a case, the first bearing 216 and the second bearing 217 may support an upper washing shaft 211 instead of the lower washing shaft 215, or alternatively the first bearing 216 may support the upper washing shaft 211 while the second bearing 217 may support the lower washing shaft 215.

The driving assembly 200 according to the embodiment of the present disclosure may include a bearing housing 230 having an inner space in which the epicyclic gear module 240 and the clutch mechanism 270 may be provided.

The bearing housing 230 may support a washing shaft 210 and the spin-drying shaft 220, and a plurality of gears of the epicyclic gear module 240. The bearing housing 230 may be provided below and fixed to a bottom of the outer tub 20 by a fastening member (e.g., bolt, screw, or boss). The bearing housing 230 may include a housing case 230a at an inner center thereof in which the epicyclic gear module 240 and the clutch mechanism 270 may be provided and a housing cover 230b covering an opened upper surface of the housing case 230a.

An upper washing shaft 211 and an upper spin-drying shaft 221 may be inserted through a center of an upper surface of the housing cover 230b. The lower washing shaft 215 and the lower spin-drying shaft 225 may be inserted through a center of a lower surface of the housing case 230a. The upper washing shaft 211 and the lower washing shaft 215 may form a washing shaft or a first shaft, while the lower washing shaft 215 and the lower spin-drying shaft 225 may form a spin-drying shaft or a second shaft.

The upper spin-drying shaft 221 and the lower spin-drying shaft 225 may be coupled against each other while forming a space in which the epicyclic gear module 240 may be provided. The lower washing shaft 215 may extend downward through a center of the epicyclic gear module 240, and the upper washing shaft 211 may be coupled to an upper part or section of the epicyclic gear module 240 and extend upward. A surface or position where the housing case 230a and the housing cover 230b are coupled may lie on the same plane as or a plane adjacent to a surface or position where the upper spin-drying shaft 221 and the lower spin-drying shaft 225 are coupled.

A first sleeve 230c may extend from the center of the housing cover 230b, and the upper spin-drying shaft 221 may pass through the first sleeve 230c to connect to the epicyclic gear module 240. An upper shaft support bearing 203 may be interposed between an outer circumferential surface of the upper spin-drying shaft 221 and the first sleeve 230c so that the upper spin-drying shaft 221 may be rotatably supported. When the upper spin-drying shaft 221 rotates, a friction force between the upper spin-drying shaft 221 and the first sleeve 230c may be reduced or prevented from occurring due to the upper shaft support bearing 203.

A second sleeve 230d may extend from the center of the housing case 230a to receive the clutch mechanism 270. The second sleeve 230d may have an inner diameter or width greater than that of a support part or section 225b of the lower spin-drying shaft 225 supporting the epicyclic gear module 240. The clutch mechanism 270 may be provided in a space formed between the second sleeve 230d and a shaft part 225a and the support part 225b of the lower spin-drying shaft 225 to surround the lower spin-drying shaft 225.

The lower washing shaft 215 and the lower spin-drying shaft 225 may be inserted through the center of a bottom of the housing case 230*a*. A third sleeve 230*e* may be extended to the center of the bottom of the housing case 230*a*, and the lower spin-drying shaft 225 may pass through the third sleeve to connect to the epicyclic gear module 240. A lower shaft support bearing 205 may be provided between the third sleeve 230*e* and the lower spin-drying shaft 225 so that the lower spin-drying shaft 225 may be rotatably supported. When the lower spin-drying shaft 225 rotates, a friction force between the lower spin-drying shaft 225 and the third sleeve 230*e* may be reduced or prevented from occurring due to the lower shaft support bearing 205.

A drive motor may surround the housing case 230*a*. The drive motor may include a stator generating a magnetic force by an applied power source and a rotor 290 rotating by an induced electromotive force through interaction with the stator. A lower part of the housing case 230*a* may be provided in a hollow formed in a center of the stator, and the stator and rotor 290 may be provided outside the second sleeve 230*d* and the third sleeve 230*e*.

The rotor 290 may include a wall surrounding the stator and a bottom 291 connecting a lower part of the wall and extending below the bearing housing 230. The bottom 291 of the rotor 290 may have an edge or rim 292 coupled to a lower end of the lower washing shaft 215 at a center. A lower end or rim 230*f* of the housing case 230*a* may be opened to form a gap or space around the lower washing shaft 215, and the bottom 291 of the rotor 290 may be bent upward toward the rim 292, which may be provided in a lower section of the opening defined by the lower rim 230*f* of the housing case 230*a*. The lower rim 230*f* may extend horizontally or radially inward. The rim 292 of the bottom 291 of the rotor 290 may be screwed around the lower washing shaft 215 so that the lower washing shaft 215 may rotate together with a rotation of the rotor 290.

Referring to FIG. 10, in the washing mode, the driving assembly 200 may rotate a pulsator (like pulsator 50 in FIG. 1) while the lower washing shaft 215 engaged or serration-fitted with the rotor 290 may rotate while the rotor 290 rotates. A sun gear 244 coupled with the lower washing shaft 215 may rotate, an epicyclic gear 242 serration-fitted with the sun gear 244 may rotate, and the upper washing shaft 211 connected to the epicyclic gear 242 may rotate.

The clutch mechanism 270 may be maintained in an ascended state of the clutch core 272, and the coupler 250 connected to the clutch core 272 may also be maintained in the ascended state. Since the lower spin-drying shaft 225 may be isolated from the lower washing shaft 215, the lower spin-drying shaft 225 may not rotate. In such a state, the pulsator may rotate, while an inner tub (like inner tub 130 of FIG. 1) may remain stationary.

Referring to FIG. 11, in the spin-drying mode, the driving assembly 200 may rotate the pulsator while the lower washing shaft 215 engaged or serration-fitted with the rotor 290 may rotate while the rotor 290 rotate. The sun gear 244 coupled with the lower washing shaft 215 may rotate, the epicyclic gear 242 serration-fitted with the sun gear 244 may rotate, and the upper washing shaft 211 connected to the epicyclic gear 242 may rotate.

The clutch mechanism 270 may descend the clutch core 272, and the coupler 250, which is connected to the clutch core 272, may also descend. One side of the coupler 250 may be serration-fitted with the lower washing shaft 215, and the other side of the coupler 250 may be serration-fitted with the lower spin-drying shaft 225. The lower spin-drying shaft 225 may be connected to the lower washing shaft 215 through the coupler 250 to receive a rotational force of the drive motor and rotate. The washing shaft 210 and the spin-drying shaft 220 may rotate together by the rotational force of the rotor 290. In such a state, the pulsator may rotate along with a rotation of the inner tub, which may serve as a drum when the washing shaft 210 and the spin-drying shaft 220 are engaged via the coupler 250.

Embodiments disclosed herein may provide a drive apparatus for a washing machine capable of maximizing washing machine capacity while preventing durability deterioration by providing a clutch structure between bearings supporting a spin-drying shaft while shortening a length of a driving assembly in order to increase laundry capacity in top-loading washing machines.

A drive apparatus or assembly for a washing machine according to an embodiment may transmit a driving force in the washing machine. The washing machine may have a case, an outer tub which is installed inside the case and accommodates wash water, an inner tub which is installed inside the outer tub and accommodates laundry, and a pulsator which is installed inside the inner tub and rotated by receiving the driving force. The drive apparatus may have a drive motor comprising a stator and a rotor, a washing shaft whose lower end is connected to the rotor to rotate together with the rotor and whose upper end is connected to the pulsator to rotate the pulsator, a hollow spin-drying shaft which is formed with a hollow part or opening for accommodating the washing shaft, the hollow spin-drying shaft having a lower end provided to be adjacent the rotor and upper end connected to the inner tub, a coupler provided to be movable up and down on one side of the spin-drying shaft and selectively connecting the spin-drying shaft to the rotor, and a clutch providing power to move the coupler up and down. A length of the washing shaft and spin-drying shaft may be shortened or reduced.

The drive apparatus for a washing machine may comprise a first bearing supporting an upper outer circumferential surface of the washing shaft and a second bearing supporting a lower outer circumferential surface of the washing shaft. The coupler may be provided between the first bearing and the second bearing in an axial direction. Therefore, durability of the bearing may be improved by securing a distance between the first bearing and the second bearing while shortening the length of the washing shaft and the spin-drying shaft.

At this time, the clutch may comprise a clutch driving assembly generating a driving force and a clutch moving assembly which is moved up and down by the driving force generated by the clutch driving assembly and which is connected to the coupler. The clutch moving assembly may be provided between the first bearing and the second bearing in the axial direction.

One side of the first bearing and the second bearing may be supported by the washing shaft, and other side may be supported by the spin-drying shaft. Alternatively, the first bearing and the second bearing may be provided between the washing shaft and the spin-drying shaft. The first bearing and the second bearing may be provided between the washing shaft and the spin-drying shaft, and the clutch moving assembly may be provided on an outside of the spin-drying shaft.

The coupler may be connected to the clutch moving assembly through the spin-drying shaft. The clutch driving assembly may comprise a solenoid coil, and the clutch moving assembly may move in the axial direction by an electromagnetic force generated by the clutch driving assembly.

The washing shaft may comprise a first coupler serration-fitting assembly provided on an outer circumferential surface of the lower end of the washing shaft, the spin-drying shaft may comprise a second coupler serration-fitting assembly provided on an inner circumferential surface of the lower end of the spin-drying shaft, and one side of the coupler may be serration-fitted with the first coupler serration fitting assembly while the other side of the coupler may be serration-fitted with the second coupler serration fitting assembly.

The rotor may comprise a wall part or wall surrounding the stator to be provided inside and a bottom part or bottom extending to a lower part of the wall part. The bottom of the rotor may be coupled to a lower part or section of the washing shaft.

The drive apparatus for a washing machine may comprise a bearing housing penetrated up and down by the washing shaft and the spin-drying shaft and accommodating the coupler and the clutch inside. The drive apparatus may comprise an upper side support bearing rotatably supporting an upper part or section of the spin-drying shaft and a lower side support bearing rotatably supporting a lower part or section of the spin-drying shaft. The clutch may be provided between the upper side support bearing and the lower side support bearing. The clutch may be provided between the spin-drying shaft and the bearing housing.

Alternatively, the bearing housing may comprise a first sleeve receiving the upper side support bearing to support the outside of the spin-drying shaft, a second sleeve receiving the clutch provided on the outside of the spin-drying shaft, and a third sleeve receiving the lower side support bearing to support the outside of the spin-drying shaft.

A drive apparatus for a washing machine according to the present disclosure may increase the life of the bearing and at the same time increase the washing capacity while minimizing a distance change between the upper and lower bearings so that a length of the driving assembly may be shortened by providing the clutch between the upper and lower bearing housings that support the spin-drying shaft.

According to at least one of the embodiments of the present disclosure, it may be advantageous to modularize the driving assembly since the gearbox and the clutch may be located inside the bearing housing.

Embodiments disclosed herein may be implemented as a drive assembly for a washing machine, the washing machine having a case, an outer tub provided inside the case to receive wash water, an inner tub provided inside the outer tub to receive laundry, and a pulsator provided inside the inner tub and configured to be rotatable by the drive assembly. The drive assembly may comprise a drive motor having a stator and a rotor, a first shaft having an upper end and a lower end, the lower end of the first shaft being connected to the rotor to rotate and the upper end of the first shaft being connected to the pulsator to rotate the pulsator, a second shaft at least partially surrounding the first shaft and having an upper end and a lower end, the lower end of the second shaft being adjacent the rotor and the upper end of the second shaft being connected to the inner tub, a coupler configured to be movable in an axial direction of the first shaft and provided at an inner circumferential surface of the second shaft, the coupler being configured to connect and disconnect the second shaft to and from the rotor, and a clutch providing power to move the coupler in the axial direction.

A first bearing may support an upper outer circumferential surface of a lower section of the first shaft. A second bearing may support a lower outer circumferential surface of the lower section of the second shaft. The coupler may be provided between the first bearing and the second bearing in the axial direction.

The clutch may include a clutch drive component generating a driving force and a clutch moving component which may be moved in the axial direction by the driving force generated by the clutch drive component. The clutch moving component may be connected to the coupler and provided between the first bearing and the second bearing in the axial direction.

Inner sides of the first and second bearings may be supported by the first shaft, and outer sides of the first and second bearings may be supported by the second shaft. The first bearing and the second bearing may be provided between the first shaft and the second shaft in a radial direction of the first shaft.

The first bearing and the second bearing may be provided between the first shaft and the second shaft. The clutch moving component may be provided radially outside of the second shaft.

The coupler may be connected to the clutch moving component through the second shaft. The clutch drive component may include a solenoid coil, and the clutch moving component may move in the axial direction by an electromagnetic force generated by the clutch drive component.

The lower end of the first shaft may include a first coupler serration-fitting assembly provided on an outer circumferential surface. The lower end of the second shaft may include a second coupler serration-fitting assembly provided on an inner circumferential surface. The coupler may include an inner surface serration-fitted with the first coupler serration fitting assembly and an outer surface serration-fitted with the second coupler serration fitting assembly. The rotor may include a wall surrounding the stator and a bottom extending from a lower section of the wall and coupled to the lower section of the first shaft.

The coupler and clutch may be provided in a bearing housing. The first shaft and the second shaft may penetrate the bearing housing.

An upper side support bearing may rotatably support an upper section of the second shaft. A lower side support bearing may rotatably support a lower section of the second shaft. The clutch may be provided between the upper side support bearing and the lower side support bearing.

The clutch may be provided between the second shaft and the bearing housing. The bearing housing may include a first sleeve in which the upper side support bearing may be provided to support an outside of the second shaft, a second sleeve in which the clutch may be provided, and a third sleeve in which the lower side support bearing may be provided to support the outside of the second shaft.

Embodiments disclosed herein may be implemented as a drive assembly for a washing machine. The washing machine may have a case, an outer tub provided in the case to receive wash water, an inner tub provided in the outer tub to receive laundry, and a pulsator provided in the inner tub and configured to be rotatable by the drive assembly. The drive assembly may comprise a drive motor, a first shaft connected to the drive motor and the pulsator so that the first shaft may be rotated by the drive motor and the pulsator may be rotated by the first shaft, a second shaft surrounding the first shaft, the second shaft being provided adjacent the drive motor and connected to the inner tub, a coupler configured to be movable in an axial direction of the first shaft and provided at a side of the second shaft, the coupler being configured to connect and disconnect the second shaft to and from the drive motor, a clutch providing power to move the coupler in the axial direction, a first bearing supporting an upper outer circumferential surface of a lower section of the first shaft, and a second bearing supporting a lower outer circumferential surface of the lower section of the first shaft. The coupler may be provided between the first bearing and the second bearing in the axial direction.

The first bearing and the second bearing may be provided between the first shaft and the second shaft in a radial direction of the first shaft. The clutch may comprise a clutch drive component generating a driving force and a clutch moving component which may be moved in the axial direction by the driving force generated by the clutch drive component. The clutch moving component may be connected to the coupler and provided between the first bearing and the second bearing in the axial direction.

The clutch moving component may be provided radially outside of the second shaft. The coupler may be connected to the clutch moving component through the second shaft.

Embodiments disclosed herein may be implemented as a washing machine comprising a case, an outer tub provided in the case, an inner tub provided in the outer tub, a pulsator provided in the inner tub and configured to rotate, a drive motor provided under the outer tub, a first shaft connected to the drive motor and the pulsator, a second shaft at least partially surrounding the first shaft and connected to the inner tub, a coupler configured to be movable in an axial direction of the first shaft to connect and disconnect the second shaft to and from the drive motor, a clutch providing power to move the coupler, a first bearing supporting an outer circumferential surface of the first shaft, and a second bearing supporting the outer circumferential surface of the first shaft. The coupler may be provided between the first bearing and the second bearing in the axial direction.

Some or other embodiments of the present disclosure described above are not exclusive or distinct from one another. Some or other embodiments of the present disclosure described above may be used in combination or combined with each configuration or function.

Configuration A described in specific embodiments and/or drawings and configuration B described in other embodiments and/or drawings may be combined. Even when the combination between the components or configurations is not directly described, the combination may be possible unless the combination is described as not possible.

The above detailed description should not be construed as limiting in all respects and should be considered as illustrative. The scope of the present disclosure should be determined by reasonable interpretation of the appended claims, and all changes within the equivalent scope of the present disclosure are included in the scope of the present disclosure.

In describing the embodiments disclosed herein, when a component is referred to as being "connected" or "accessed" to other component, such a component may be directly connected or accessed to the other component, or indirectly connected such that other components may be present in therebetween.

In describing the embodiments disclosed herein, when it is determined that the detailed description of the related known technology may obscure the subject matter of the embodiments disclosed in the present disclosure, the detailed description thereof is omitted. The accompanying drawings are for easy understanding of the embodiments disclosed, and the technical spirit disclosed in the present disclosure is not limited by the accompanying drawings. It should be understood that the accompanying drawings include all changes, equivalents, and substitutes included in the spirit and scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A drive assembly for a washing machine, the washing machine having a case, an outer tub provided inside the case to receive wash water, an inner tub provided inside the outer tub to receive laundry, and a pulsator provided inside the inner tub and configured to be rotatable by the drive assembly, the drive assembly comprising:
    a drive motor having a stator and a rotor;
    a first shaft having an upper end and a lower end, the lower end of the first shaft being connected to the rotor to rotate and the upper end of the first shaft being connected to the pulsator to rotate the pulsator;
    a second shaft at least partially surrounding the first shaft and having an upper end and a lower end, the lower end of the second shaft being adjacent the rotor and the upper end of the second shaft being connected to the inner tub;
    a coupler configured to be movable in an axial direction of the first shaft and provided at an inner circumferential surface of the second shaft, the coupler being configured to connect and disconnect the second shaft to and from the rotor;
    a clutch providing power to move the coupler in the axial direction;
    a first bearing supporting an upper outer circumferential surface of the first shaft; and
    a second bearing supporting a lower outer circumferential surface of the first shaft,
    wherein the coupler is provided between the first bearing and the second bearing in the axial direction,
    wherein the clutch includes a clutch drive component generating a driving force and a clutch moving component which is moved in the axial direction by the driving force generated by the clutch drive component, the clutch moving component being connected to the coupler and provided between the first bearing and the second bearing in the axial direction,
    wherein the first bearing and the second bearing are provided between the first shaft and the second shaft, and the clutch moving component is provided radially outside of the second shaft, and
    wherein the coupler is connected to the clutch moving component through the second shaft.

2. The drive assembly of claim 1, wherein inner sides of the first and second bearings are supported by the first shaft, and outer sides of the first and second bearings are supported by the second shaft.

3. The drive assembly of claim 1, wherein the first bearing and the second bearing are provided between the first shaft and the second shaft in a radial direction of the first shaft.

4. The drive assembly of claim 1, wherein the clutch drive component includes a solenoid coil, and the clutch moving component moves in the axial direction by an electromagnetic force generated by the clutch drive component.

5. The drive assembly of claim 1, wherein:
    the lower end of the first shaft includes a first coupler serration-fitting assembly provided on an outer circumferential surface,
    the lower end of the second shaft includes a second coupler serration-fitting assembly provided on an inner circumferential surface, and
    the coupler includes an inner surface serration-fitted with the first coupler serration fitting assembly and an outer surface serration-fitted with the second coupler serration fitting assembly.

6. The drive assembly of claim 1, wherein the rotor includes a wall surrounding the stator and a bottom extending from a lower section of the wall and coupled to the lower section of the first shaft.

7. The drive assembly of claim 1, further comprising a bearing housing in which the coupler and clutch are provided, wherein the first shaft and the second shaft penetrate the bearing housing.

8. The drive assembly of claim 7, further comprising:
    an upper side support bearing rotatably supporting an upper section of the second shaft, and
    a lower side support bearing rotatably supporting a lower section of the second shaft, wherein the clutch is provided between the upper side support bearing and the lower side support bearing.

9. The drive assembly of claim 8, wherein the clutch is provided between the second shaft and the bearing housing.

10. The drive assembly of claim 8, wherein the bearing housing includes a first sleeve in which the upper side support bearing is provided to support an outside of the second shaft, a second sleeve in which the clutch is provided, and a third sleeve in which the lower side support bearing is provided to support the outside of the second shaft.

11. A drive assembly for a washing machine, the washing machine having a case, an outer tub provided in the case to receive wash water, an inner tub provided in the outer tub to receive laundry, and a pulsator provided in the inner tub and configured to be rotatable by the drive assembly, the drive assembly comprising:
    a drive motor;
    a first shaft connected to the drive motor and the pulsator so that the first shaft is rotated by the drive motor and the pulsator is rotated by the first shaft;
    a second shaft surrounding the first shaft, the second shaft being provided adjacent the drive motor and connected to the inner tub;
    a coupler configured to be movable in an axial direction of the first shaft and provided at a side of the second shaft, the coupler being configured to connect and disconnect the second shaft to and from the drive motor;
    a clutch providing power to move the coupler in the axial direction;

a first bearing supporting an upper outer circumferential surface of a lower section of the first shaft; and
a second bearing supporting a lower outer circumferential surface of the lower section of the first shaft, wherein the coupler is provided between the first bearing and the second bearing in the axial direction,
wherein the first bearing and the second bearing are provided between the first shaft and the second shaft in a radial direction of the first shaft,
wherein the clutch comprises a clutch drive component generating a driving force and a clutch moving component which is moved in the axial direction by the driving force generated by the clutch drive component, the clutch moving component being connected to the coupler and provided between the first bearing and the second bearing in the axial direction,
wherein the clutch moving component is provided radially outside of the second shaft, and
wherein the coupler is connected to the clutch moving component through the second shaft.

12. A washing machine comprising:
a case;
an outer tub provided in the case;
an inner tub provided in the outer tub;
a pulsator provided in the inner tub and configured to rotate;
a drive motor provided under the outer tub;
a first shaft connected to the drive motor and the pulsator;
a second shaft at least partially surrounding the first shaft and connected to the inner tub;
a coupler configured to be movable in an axial direction of the first shaft to connect and disconnect the second shaft to and from the drive motor;
a clutch providing power to move the coupler;
a first bearing supporting an outer circumferential surface of the first shaft; and
a second bearing supporting the outer circumferential surface of the first shaft, wherein the coupler is provided between the first bearing and the second bearing in the axial direction,
wherein the first bearing and the second bearing are provided between the first shaft and the second shaft in a radial direction of the first shaft,
wherein the clutch includes a clutch drive component generating a driving force and a clutch moving component which is moved in the axial direction by the driving force generated by the clutch drive component, the clutch moving component being connected to the coupler and provided between the first bearing and the second bearing in the axial direction,
wherein the clutch moving component is provided radially outside of the second shaft, and
wherein the coupler is connected to the clutch moving component through the second shaft.

* * * * *